US008597766B2

(12) United States Patent
Nilsson et al.

(10) Patent No.: US 8,597,766 B2
(45) Date of Patent: Dec. 3, 2013

(54) PROCESS FOR MANUFACTURE OF SURFACE ELEMENTS

(75) Inventors: Magnus N. Nilsson, Trelleborg (SE); Lars Ohlsson, Höllviken (SE); Magdalena Christiansson, Trelleborg (SE); Krister Hansson, Trelleborg (SE); Jan Ericsson, Helsingborg (SE)

(73) Assignee: Pergo (Europe) AB, Trelleborg (SE)

( * ) Notice: Subject to any disclaimer, the term of this patent is extended or adjusted under 35 U.S.C. 154(b) by 660 days.

(21) Appl. No.: 12/349,349

(22) Filed: Jan. 6, 2009

(65) Prior Publication Data

US 2009/0208705 A1 Aug. 20, 2009

Related U.S. Application Data

(63) Continuation of application No. 09/964,838, filed on Sep. 28, 2001, now Pat. No. 7,476,351.

(30) Foreign Application Priority Data

Oct. 3, 2000 (SE) ...................................... 0003550

(51) Int. Cl.
*D06N 7/04* (2006.01)
*B32B 3/28* (2006.01)
*B32B 5/16* (2006.01)

(52) U.S. Cl.
USPC ........... 428/142; 428/141; 428/143; 428/148; 428/149; 428/156; 428/151; 428/220; 428/328; 428/329; 428/331; 428/908.8

(58) Field of Classification Search
USPC .............. 428/908.8, 142, 141, 143, 148, 149, 428/156, 151, 220, 328, 329, 331
See application file for complete search history.

(56) References Cited

U.S. PATENT DOCUMENTS 3,196,030 A 7/1965 Petry
3,808,024 A 4/1974 Witman
3,899,611 A * 8/1975 Hall .............................. 427/488
4,092,198 A 5/1978 Scher et al.
RE30,233 E * 3/1980 Lane et al. .................... 428/207
4,216,251 A 8/1980 Nishimura et al.
4,318,950 A 3/1982 Takashi et al.
4,384,904 A 5/1983 Kauffman et al.
5,344,692 A 9/1994 Schmoock
5,458,953 A * 10/1995 Wang et al. ................ 428/195.1
5,498,309 A 3/1996 Greten et al.
5,720,913 A 2/1998 Andersen et al.
5,804,116 A 9/1998 Schmid et al.
5,961,903 A 10/1999 Eby et al.
6,106,654 A 8/2000 Velin et al.
6,238,750 B1 5/2001 Correll et al.
6,354,915 B1 3/2002 James et al.
6,399,670 B1 6/2002 MacQueen et al.
6,465,046 B1 10/2002 Hansson et al.
6,565,919 B1 5/2003 Hansson et al.
6,685,993 B1 2/2004 Hansson et al.
2003/0207083 A1 11/2003 Hansson et al.

FOREIGN PATENT DOCUMENTS

DE 19845496 4/2000
EP 0106707 4/1984
WO WO 93/17182 9/1993
WO WO 97/00172 1/1997
WO WO 97/31776 9/1997

OTHER PUBLICATIONS

"Lacquer, Definition of", retrieved Jul. 17, 2010 from wordnetweb.princeton.edu/perl/webwn?s=lacquer.*
WPI, Derwent Accession No. 1974-60732V, Danya Sangyo KK: "Thermosetting decorative board mfr—with convex an concave patterns", Apr. 2005.
WPI, Derwent Accession No. 1994-097440, Toppan Printing Co. Ltd.: Producing embossed sheet, useful as building material—by applying radioactive ray curable resin on base sh, Apr. 2005.
Patent Abstracts of Japan, vol. 18, M-1610 abstract of JP 60-47883 A (Toppan Printing Co Ltd), Feb. 22, 1994).
WPI, Derwent Acoission No. 1994-097387, Toppan Printing Co Ltd.: Embossing moulding process reducing air bubbles—in which ionising radiation curable type resin is coated on Apr. 2005.
Patent Abstracts of Japan, vol. 18, M-1610 abstract of JP 60-47860 A (Toppan Printing Co. Ltd.), Feb. 22, 1994.
WPI, Derwent Accession No. 1994-205294, Toppan Printing Co. Ltd.: Embossed decorative board prodn.—involves contacting embossing roll with resin-coated baseboard then irrad, Apr. 2005.
Patent Abstracts of Japan, vol. 18, c-1242 Abstract of JP 61-42603 A (Toppan Printing Co., Ltd.), May 24, 1994.
WPI, Derwent Accession No. 1994-114876, Toppan Printing Co., Ltd.: Prepn. Of embossed decorative sheet with good design effect—by heating electron beam curable resin, apply, Apr. 2005.
Patent Abstracts of Japan, vol. 18, M-1619 abstract of JP 60-64129 A (Toppan Printing Co. Ltd.), Mar. 8, 1994.
WPI, Derwent Accessin No. 1995-307845, Yamaha Corp.: Decorative wood plate—comprises (semi)transparent coating film of synthetic resin material formed on surface of decorat, Apr. 2005.
Patent Abstracts of Japan, No. 11 abstract of JP 72/5109 A (Yamaha Corp.), Aug. 8, 1995.
"Lacquer", "Resin". Hackh's Chemical Dictionary. 1969.

* cited by examiner

*Primary Examiner* — William P Watkins, III
(74) *Attorney, Agent, or Firm* — Novak Druce Connolly Bove + Quigg LLP

(57) ABSTRACT

A process for the manufacture of a decorative surface element, which element comprises a base layer, a decor and a wear layer of a UV or electron beam curing lacquer. One or more structured surfaces, forming embossing surfaces of one or more rollers or moulds, are positioned on top of the decorative lacquered surface, possibly after having cured the lacquer to a desired viscosity, and are continuously or discontinuously pressed on to this. The lacquer will be provided with a surface structure which enhances the decorative effect of the decor. The wear layer is then completely cured.

7 Claims, No Drawings

PROCESS FOR MANUFACTURE OF SURFACE ELEMENTS

CROSS REFERENCE TO RELATED APPLICATIONS

This application is a Continuation of U.S. application Ser. No. 09/964,838, filed Sep. 28, 2001, (now U.S. Pat. No. 7,475,351).

The present invention relates to a process for the manufacture of decorative surface elements with a surface structure matching the decor of the upper surface.

Products coated with simulated versions of materials such as wood and marble are frequent today. They are foremost used where a less expensive material is desired, but also where resistance towards abrasion, indentation and different chemicals and moisture is required. As an example of such products floors, floor beadings, table tops, work tops and wall panels can be mentioned.

As an example of an existing product can be mentioned the thermosetting laminate which mostly consists of a number of base sheets with a decor sheet placed closest to the surface. The decor sheet can be provided with a desired decor or pattern. Frequently used patterns usually represent the image of different kinds of wood or minerals such as marble or granite. The surface of the laminate can, at the laminating procedure, be provided with a structure, which will make the decor more realistic. Press plates with structure or structure foils are here frequently used during the pressing of the laminate. A negative reproduction of the structure in the press plate or the foil will be embossed into the laminate surface during the laminating procedure.

The structure suitably represents features characteristic for the pattern the decor represents. The structure can be made coarse to simulate for example rough planed stone, or smooth with randomly placed pits and micro cracks to simulate polished marble. When the surface of wood is simulated the surface is provided with randomly placed thin oblong indentations which imitate pores.

It has for a long time been a great need to be able to manufacture simulated materials where a lacquer is used as a top coat on a decor. The only way, so far, to achieve a surface structure in lacquer is casting or abrasive moulding which both are time consuming and expensive processes.

According to the present invention the above mentioned needs have been met and a surface element with a decorative surface with a surface structure has been achieved. The invention relates to a process for the manufacture of a decorative surface element. The element comprises a base layer, a decor and a wear layer of a UV or electron beam curing lacquer. The invention is characterised in that one or more structured surfaces forming embossing surfaces of or more rollers or moulds are positioned on top of the decorative lacquered surface, possibly after having cured the lacquer to a desired viscosity, and are continuously or discontinuously pressed on to this. The lacquer will hereby be provided with a surface structure which enhances the decorative effect of the decor. The wear layer is then completely cured. The lacquer preferably consists of a UV-curing or electron beam curing acrylic or maleamide lacquer. The wear layer is preferably applied in several steps with intermediate partial curing. The wear layer preferably also includes hard particles with an average particle size in the range 50 nm-150 μm. The base layer may suitably consist of a particle board or a fibre board but may also be made of a material which mainly consist of a polymer such as polyurethane.

In order to make the structuring process run smoother, the surface cement preferably contains a layer which is elastic at least before the complete curing. The elastic layer is selected from the group consisting of; the base layer, a primer layer, the decor layer and the wear layer.

The structuring process will most often result in undesirable raised sections in the surface. These sections can be planed out by pressing one or more glazing rollers towards the surface structured wear layer before the complete curing stage.

The structured rollers are preferably heated to a surface temperature above 40° C. preferably in the range 50° C.-150° C. This will minimise the risk for forming of cracks. The glazing rollers are preferably also heated to a surface temperature above 30° C., preferably in the range 35° C.-100° C. for the same reason.

According to an alternative embodiment of the invention the structuring is achieved by means of a mould. The structured surface of the mould is heated to a surface temperature above 40° C., preferably in the range 50° C.-150° C. The pressure exercised by the structured mould surface is 50-200 Bar, preferably 65-100 Bar.

The glazing process will result in a surface which is easier to clean. It is also possible to achieve such a surface by applying a thin top coat on top of the structured wear layer. Such a thin top coat may of course be applied on top of the structured wear layer after the glazing stage as well. A thin top coat may advantageously also be applied on top of the structured wear layer before the glazing stage. The top coat is then partially cured before the glazing. The top coat is suitably comprised of acrylic or maleamide lacquer and does possibly have an additive in the form of hard particles with an average particle size in the range 50 nm-10 μm.

Each structured roller is provided with a counter stay roller between which the surface element is passed. Each glazing roller is preferably also provided with a counter stay roller between which the surface element is passed. The surface element has a thickness T and the distance between each structured roller and corresponding counter stay is preferably set in the range T minus 0.5 mm to 1.2 mm, preferably 0.7 mm-0.9 mm. The pressure between each structured roller and its corresponding counter stay is then 50-200 Bar, preferably 65-100 Bar.

The surface element has a thickness T and that the distance between each glazing roller and corresponding counter stay is set in the range T minus 0.7 mm-1.2 mm, preferably 0.7 mm-0.9 mm. The pressure between each glazing roller and its corresponding counter stay is suitably in the range 0.1-10 Bar, preferably 0.5-5 Bar.

The hard particles added to the lacquer consists of for example silicon oxide, α-aluminium oxide or silicon carbide. According to one embodiment of the invention the main part of the hard particles consists of for example silicon oxide, α-aluminium oxide or silicon carbide while a smaller amount of the hard particles consist of diamond. The hard particles consisting of diamond is then in the average particle size range 50 nm-2 μm and is placed close to the upper surface of the wear layer.

The rollers may, when more than one structured roller is used, be provided with different surface structures. This will make it possible to achieve a surface structure with a variation that corresponds to the visible decor.

The invention claimed is:

1. A decorative laminate product having a surface simulating a structure enhancing a décor, said surface structure selected from the group consisting of rough planed stone, smooth stone with pits or micro-cracks and wood with pores;

the laminate comprising:

a base layer comprising particle board or fiberboard;

a décor layer comprising a décor representing rough planed stone, smooth stone with pits or micro-cracks and wood with pores;

at least one mechanically embossed structured wear layer to enhance the visual aspects of the décor and make it appear more realistic;

the wear layer comprising a UV or electron beam curing acrylic or maleamide lacquer comprising hard particles;

the structure of the mechanically embossed wear layer enhancing the visual characteristics of the décor to make the décor appear more realistic; the laminate further comprising a top coat of maleamide lacquer on the structured wear layer, and, an elastic layer.

2. The laminate product of claim 1, where the elastic layer is a primer layer.

3. The laminate product of claim 1, where the hard particles in the wear layer have an average particle size of 50 nm-150 μm.

4. The laminate product of claim 1, where the wear layer comprises a plurality of separately applied layers with the intermediate partial curing.

5. The laminate product of claim 1, where the hard particles in the wear layer are selected from the group consisting of silicon oxide, alpha-aluminum oxide, silicon carbide, diamond and mixtures thereof.

6. The laminate product of claim 5, where the hard particles comprise diamond in the average particle size range of 50 nm-2 μm and are placed in a portion of the wear layer closest to an upper surface of the laminate product.

7. The laminate product of claim 1, further comprising hard particles in the top coat, the particles having an average particle size of 50 nm-10 μm.

* * * * *